(12) United States Patent
Niitsu (10) Patent No.: US 6,247,969 B1
(45) Date of Patent: Jun. 19, 2001

(54) CARD-RECEIVING CONNECTOR WITH GROUNDING TERMINAL

(75) Inventor: Toshihiro Niitsu, Machida (JP)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/468,273

(22) Filed: Dec. 20, 1999

(30) Foreign Application Priority Data

Dec. 18, 1998 (JP) ................................. 10-375902

(51) Int. Cl.[7] .................................. H01R 13/648
(52) U.S. Cl. ........................... 439/607; 439/541.5
(58) Field of Search ...................... 439/79, 541.5, 439/607, 108

(56) References Cited

U.S. PATENT DOCUMENTS

| | | | |
|---|---|---|---|
| 4,780,791 | 10/1988 | Morita et al. | 361/395 |
| 5,399,105 | 3/1995 | Kaufman et al. | 439/609 |
| 5,643,001 | 7/1997 | Kaufman et al. | 439/159 |
| 5,671,123 | 9/1997 | Omori et al. | 361/737 |
| 5,688,130 | 11/1997 | Huang | 439/79 |
| 5,711,679 | 1/1998 | Spickler et al. | 439/79 |
| 5,717,573 | 2/1998 | Sakurai | 361/737 |
| 5,775,923 | 7/1998 | Tomioka | 439/79 |
| 5,795,190 | 8/1998 | Ono | 439/607 |
| 5,954,522 | 9/1999 | Ho et al. | 439/79 |
| 5,964,597 | 10/1999 | Hirata et al. | 439/108 |
| 6,062,904 | * 5/2000 | Oguchi et al. | 439/541.5 |

* cited by examiner

Primary Examiner—Brian Sircus
Assistant Examiner—Javaid Nasri
(74) Attorney, Agent, or Firm—Stacey E. Caldwell (57) ABSTRACT

Disclosed is a card-receiving connector with a grounding terminal comprising a card-connection part and a substrate-connection part in combination. The card-connection part includes two or more rows of signal pin terminals adapted to mate with corresponding receptacle sockets of a pc card, parallel grounding terminals arranged generally parallel to the pin terminals and adapted to engaged a conductive outer panel of the card, and vertical connection rod terminals for connecting the parallel grounding terminals together, thus permitting each grounding terminal to be connected to the ground circuit of an underlying circuit board via the connection rod terminals. The signal pin terminals of the card-connection part include rear tails that mate with corresponding engagement tails of terminals of the substrate-connection part.

7 Claims, 9 Drawing Sheets

CARD-RECEIVING CONNECTOR WITH GROUNDING TERMINAL

FIELD OF THE INVENTION

The present invention relates to the art of electrical connectors and, particularly, to a card connector with a grounding terminal for connecting pc cards or other memory device to an underlying printed circuit board.

BACKGROUND

A known card-receiving connector has a lateral arrangement of signal pin terminals mounted in its insulating housing and a grounding shield or grounding terminal arranged generally parallel to the signal pin terminals. The signal pin terminals are adapted to mate with receptacle terminals arranged along a lateral edge of a mating card, and the grounding shield is adapted to engage the outer conductive panel of the card. The card connector may have a single arrangement or port of signal pin terminals for mating to a single card, or it may have two or more arrangements or ports of signal pin terminals arranged vertically above one another for receiving two or more cards. Some card connectors also include card-ejection mechanisms provided along a longitudinal side thereof.

The grounding shield of a card connector must be connected to the ground circuit of a circuit board on which the card connector is mounted. As, is well-known in the prior art a single port card connector typically has a grounding shield extending rearwardly and covering the rear tails of the signal pin terminals, and the grounding shield has grounding tails extending therefrom adapted to be connected to the ground circuit of the underlying circuit board.

A card connector having two or more ports of signal terminals ("dual or multi-port" card connectors) and which includes two or more grounding shields cannot make a simple grounding connection inasmuch as the grounding shields must connector to each other and to the ground circuit of the printed circuit board. Known dual port card connectors include a relay substrate attached to a rear side of the connector. The signal pin terminals and the tails of the grounding shields are connected to conductors of the relay substrate and the relay substrate is electrically connected to the circuit board by way of an edge connector or other board-to-board connector, thereby making the required connection between the grounding shield of the card connector and the ground circuit of the circuit board.

The above-described connection between the grounding shield of the card connector and the ground circuit of the circuit board prevents the down-sizing of a card-receiving connector, particularly the reduction of the longitudinal size of the card connector, due to the presence of the grounding shield extending rearwardly over the rear tails of the pin terminals and the relatively bulky relay substrate attached to the insulating housing. Furthermore, use of the relay substrate increases the number of parts in the card connector, and accordingly increases the cost of the connector.

SUMMARY OF THE INVENTION

An object, therefore, of the present invention is to provide a card-receiving connector which permits reduction of the size of the connector in dual and multi-port configurations.

To attain this object a card connector structure according to the present invention uses vertically extending connection rod terminals to connect grounding terminals together from different signal pin terminal ports.

Specifically, a card-receiving connector for connecting pc cards to an underlying printed circuit board comprises a card-connection part and a substrate-connection part adapted to be assembled to the card-connection part. The card-connection part includes an insulating housing having two or more lateral rows of signal pin terminals adapted to mate with corresponding receptacles in a card and two or more grounding terminals arranged generally parallel to each lateral row of signal pin terminals and adapted to engage an outer conductive panel of a respective card. The card-connection part further comprises vertically extending connection rod terminals which are mounted in the insulating housing and extend vertically in between select signal pin terminal and intersect the signal pin terminal port without contacting any of the signal pin terminals, thus permitting each grounding terminal to be connected to the ground circuit of the circuit board via the connection rod terminals.

This structure permits the connection of all of the grounding terminals to the ground circuit of the printed circuit board via the vertical connection rod terminals which are contained within the card-connection part. The vertical connector rod terminals allow the card connector to be down-sized inasmuch as they do not extend rearwardly from the rear side of the card connector and they do not require a relay substrate attached to the rear side of the insulating housing. Accordingly the size of the card connector can be longitudinally reduced.

The connection rod terminals are mounted within the insulating housing of the card-connection part, which also mounts the signal pin terminals, and a lower portion of each connection rod terminal is located on a bottom portion of the insulating housing, thus permitting the connection rod terminals to be soldered to the ground circuit of the circuit board.

The invention also contemplates that the substrate-connection part comprises a plurality of signal-transfer terminals for connecting the signal pin terminals of the card-connection part to selected conductors of the signal circuit of the circuit board, and that contact tails of the signal pin terminals, arranged on a rear side of the insulating housing of the card-connection part, are adapted to mate with corresponding contact tails of the signal-transfer terminals, arranged on a front side of the insulating housing of the substrate-connection part, when the card connection part is assembled to the substrate-connection part.

The substrate-connection part further comprises grounding terminals which are adapted to contact the connection rod terminals when the substrate-connection part is assembled to the card-connection part. The connection rod terminals are mounted in the insulating housing of the card-connection part, and the lower ends of the connection rod terminals are located in a bottom portion of the insulating housing of the card-connection part, to allow the lower ends to make contact with the grounding terminals of the substrate-connection part.

The contact tails of the signal pin terminals are arranged laterally in line for each lateral arrangement of signal pin terminals and the contact tails of the signal-transfer terminals are arranged in corresponding lines to contact the contact tails of the pin terminals upon assembly of the substrate-connection part and the card-connection part.

Other objects and advantages of the present invention will be understood from the following description of a card connector according to one preferred embodiment of the present invention, which is shown in accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Referring to FIGS. 1 through 8, a card connector 2 comprises a card-connection part 3 and a substrate-connection part 4 in combination. Card-connection part 3 includes an insulating housing 5 mounting two lateral arrangements or ports 7 of rows of signal pin terminals 6 which are adapted to mate with corresponding receptacle sockets (not shown) of a pc or memory card 1 and further includes grounding terminals 9 located generally parallel to the lateral arrangements of the signal pin terminals and which are adapted to engage the outer conductive panel of a corresponding card 1. As shown, each signal pin terminal 6 passes longitudinally through a rear portion of the insulating housing 5. Each signal pin terminal 6 in each row includes a rear tail 8 arranged laterally in line at the rear side of insulating housing 5. All rear tails 8 are arranged at an interval of one half of the interval of the signal pin terminals 6 in each row.

Figure 1:
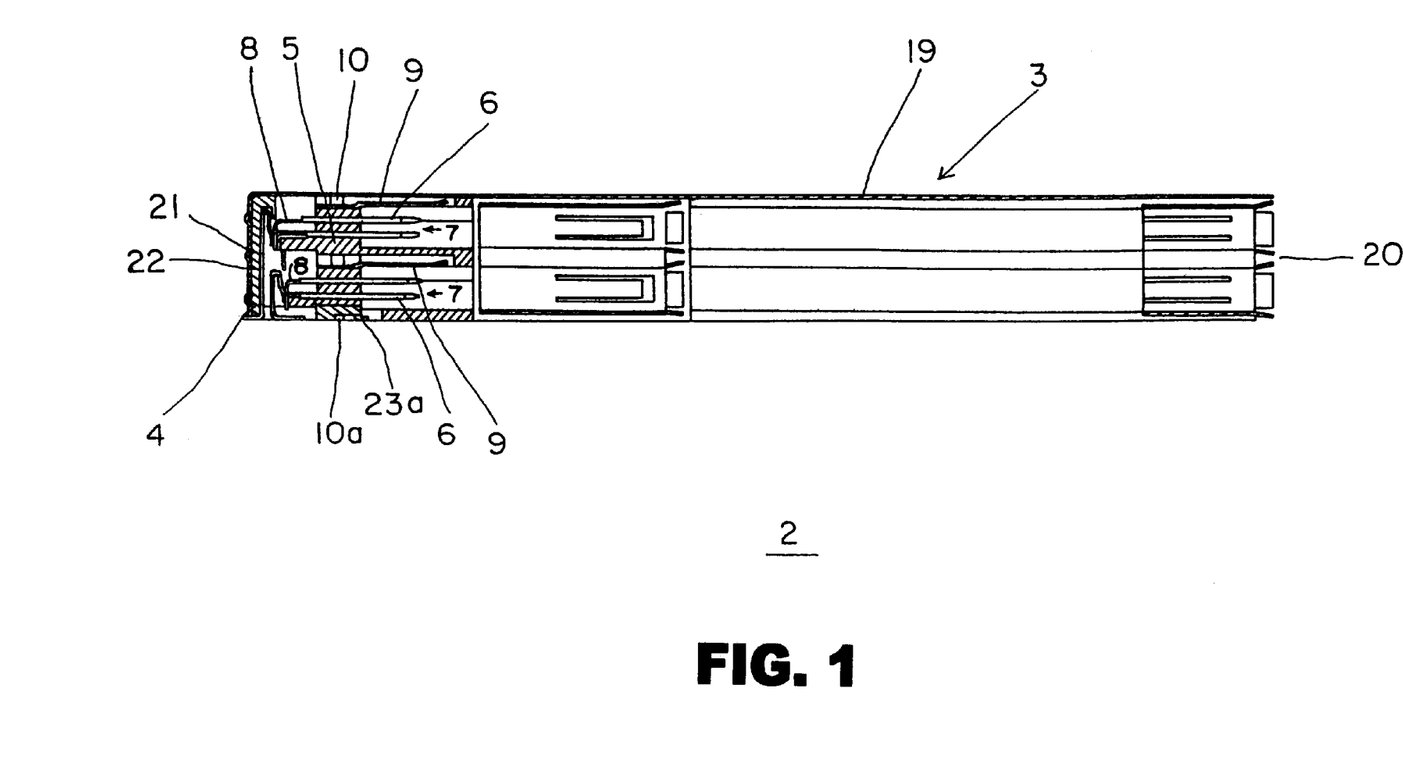
FIG. 1 is a longitudinal section of a card connector according to the present invention.
Figure 2:
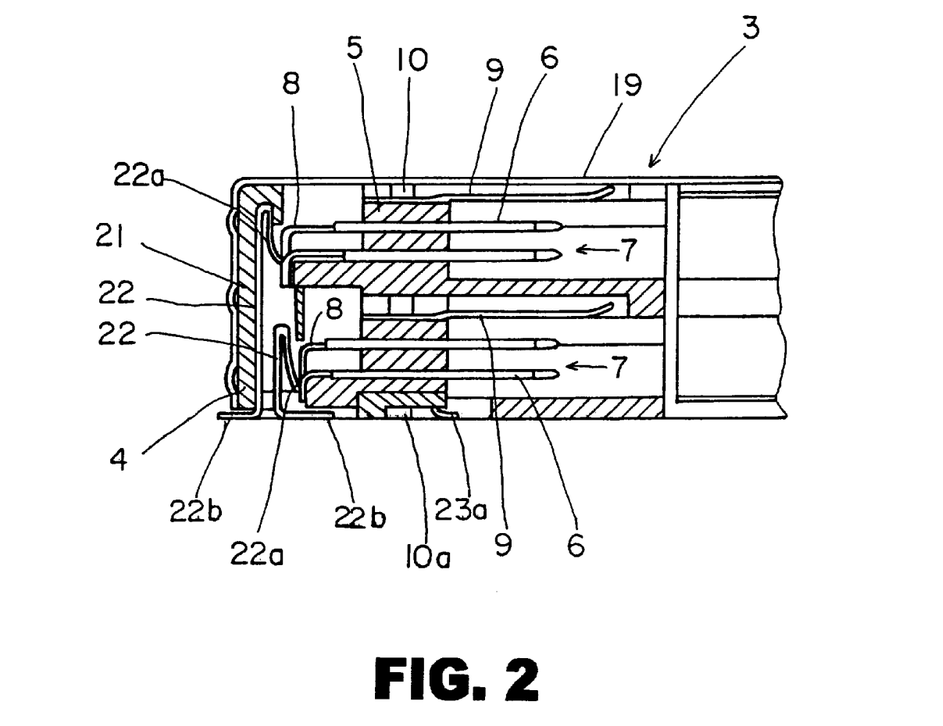
FIG. 2. is a longitudinal section of an enlarged portion of the card connector of FIG. 1, showing the inventive portion of the card connector.

Grounding terminals 9 are arranged generally parallel to each other and to ports 7 of pin terminals 6 and are adapted to engage the outer conductive panel of pc card 1. Each grounding terminal 9 corresponds to a port 7 of signal pin terminals 6. The grounding terminal of the upper port is fixed laterally in substantially the same position as that of the lower port.

Card-connection part 3 further comprises vertical connection rod terminals 10 also mounted in the insulating housing 5. As shown most clearly in FIG. 2, grounding terminals 9 are electrically coupled to each other by being connected to connection rod terminals 10. The connection rod terminals extend vertically through the insulating housing in between select signal pin terminals and intersect the signal pin terminal port without contacting any of the signal pin terminals.

Figure 8:
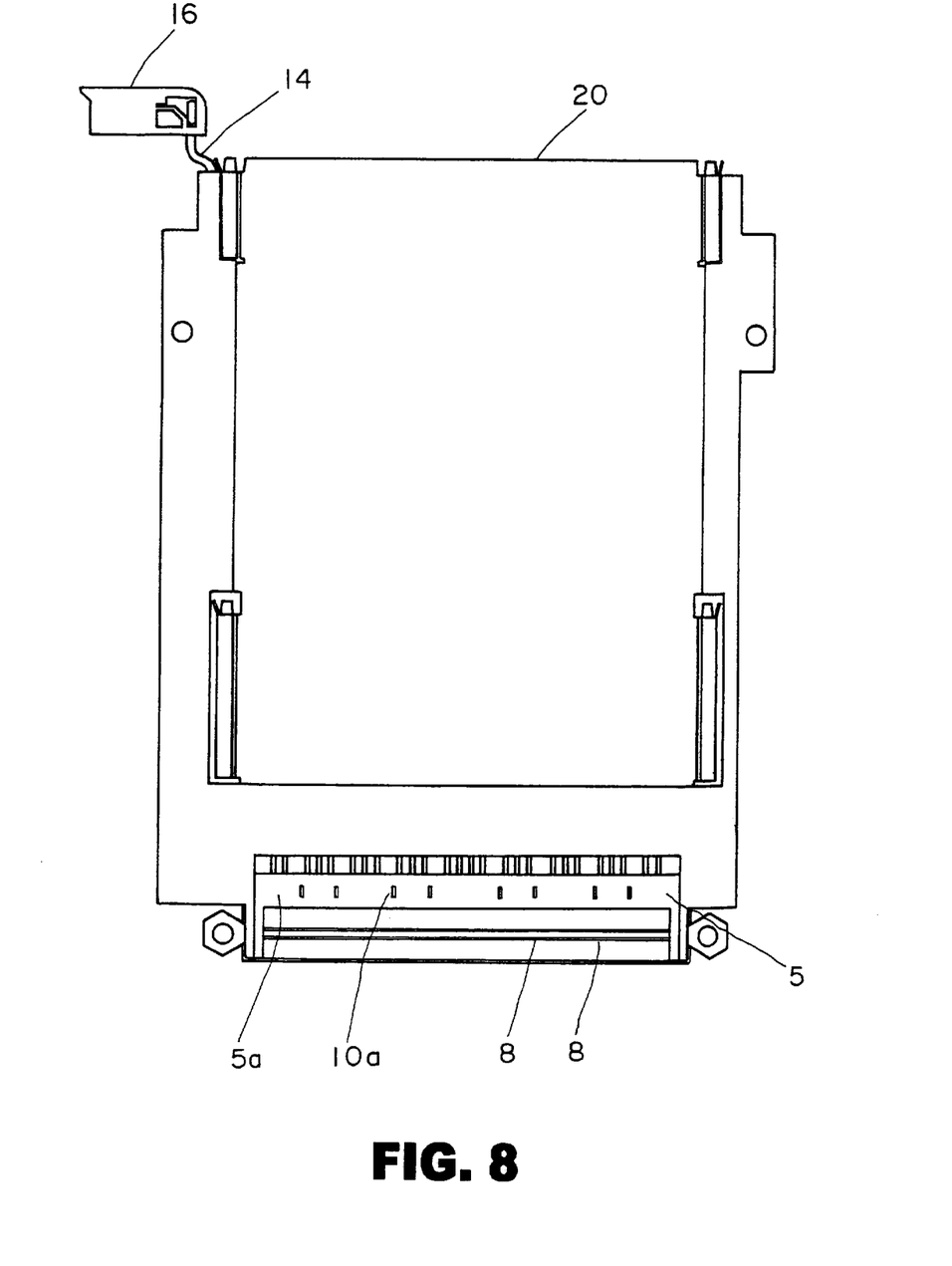
FIG. 8 is a bottom view of the card connector.

Lower portions 10a of connection rod terminals 10 are located at the bottom 5a of insulating housing 5 of card-connection part 3 (see FIG. 8). Thus, the lower ends of connection rod terminals 10 provide connection terminals 10a to connect to the ground circuit of the circuit board (not shown) on which the card connector is mounted.

Figure 3:
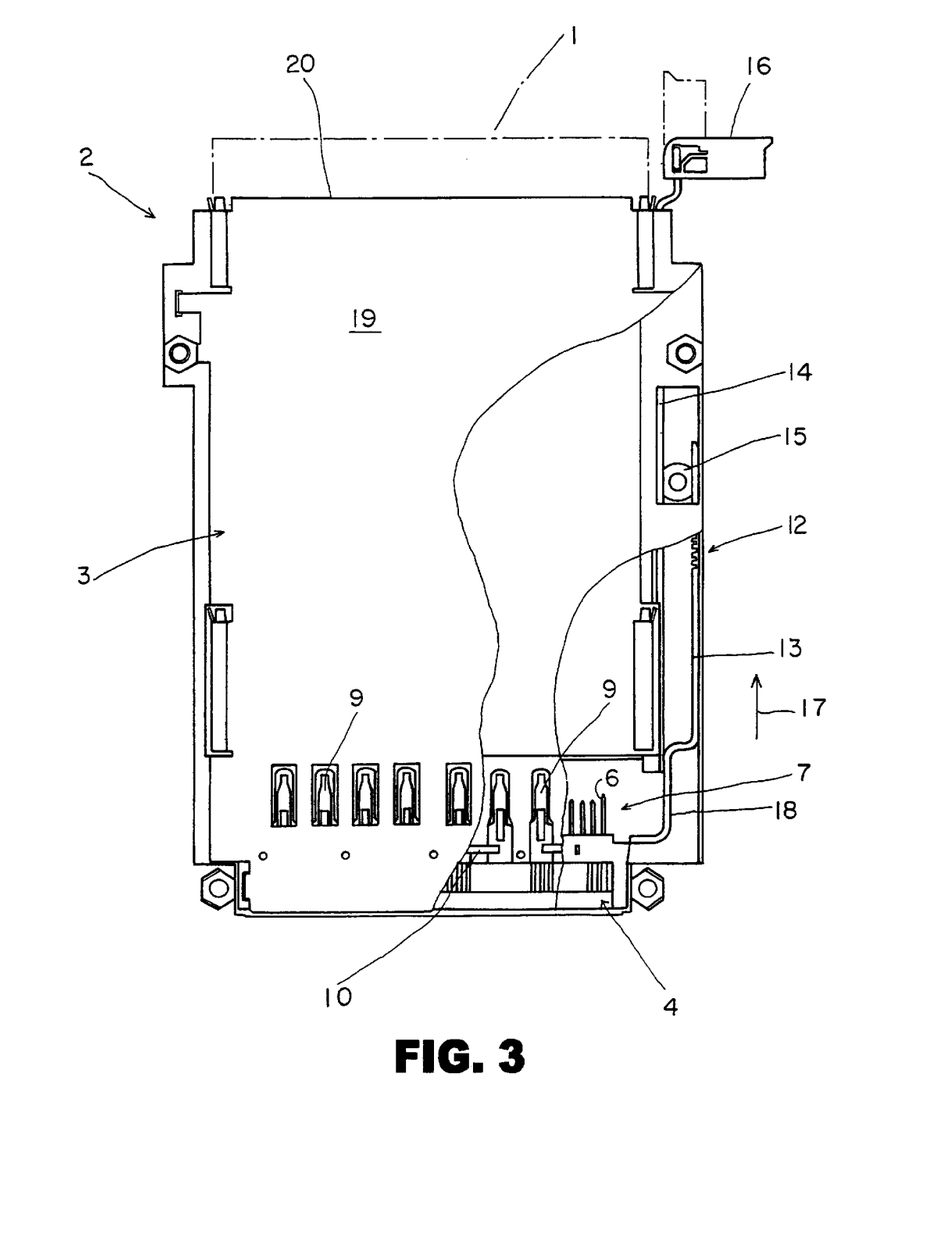
FIG. 3. is a plan view of the card connector, partially broken away to show features of the connector.
Figure 4:
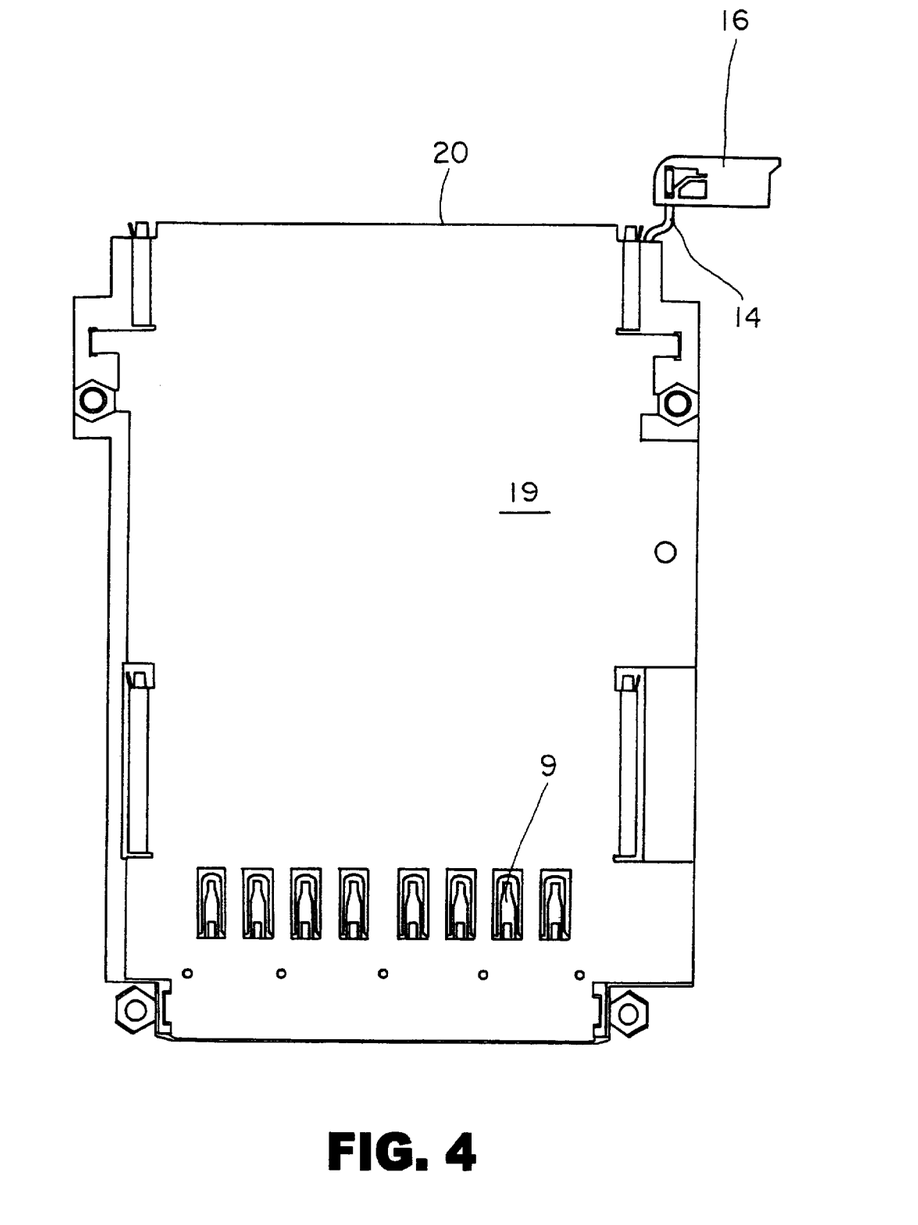
FIG. 4 is a plan view of the card connector.
Figure 5:
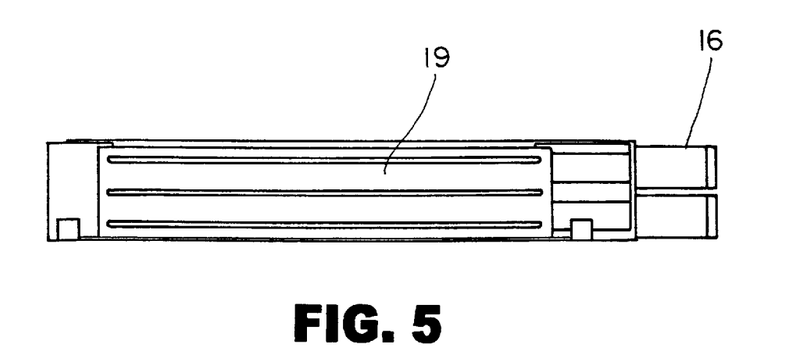
FIG. 5 is a rear view of the card connector.
Figure 6:
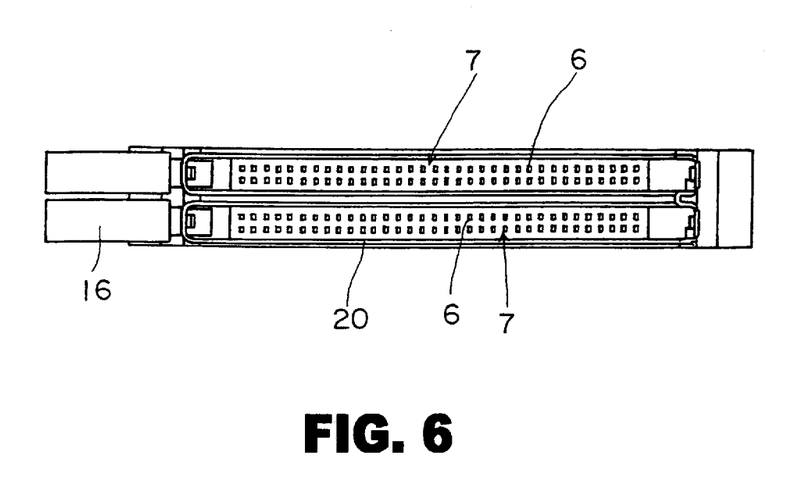
FIG. 6 is a front view of the card connector.
Figure 7:
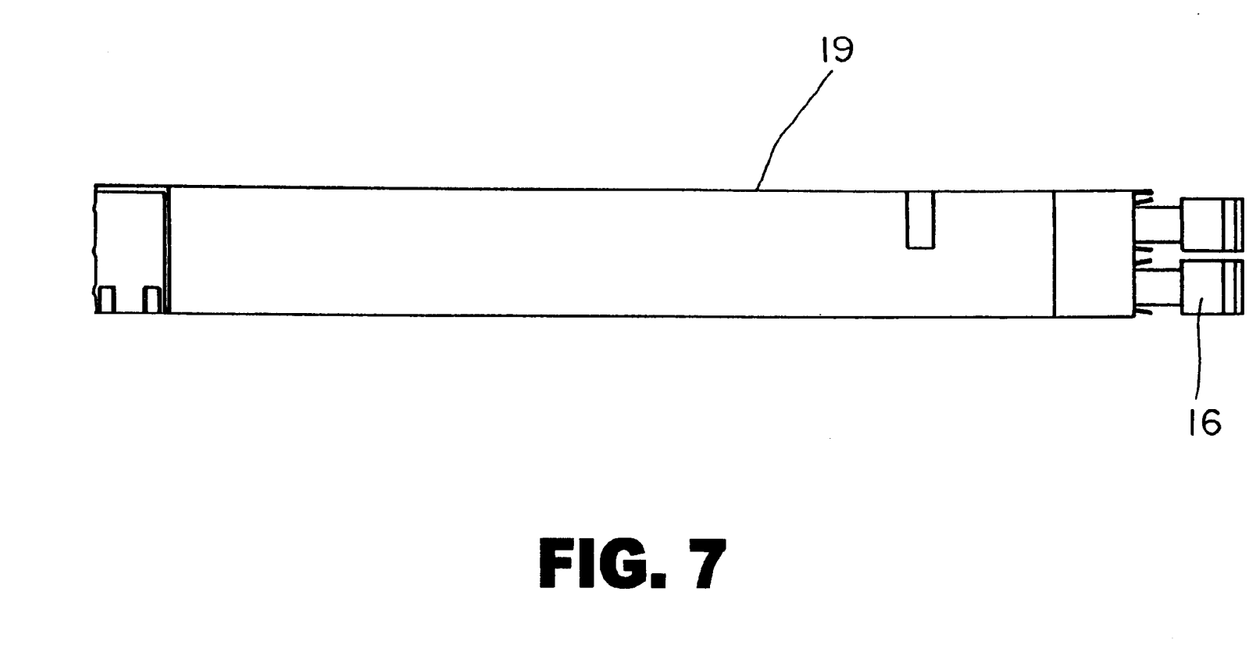
FIG. 7 is a side view of the card connector.

Two card ejection mechanisms 12 are provided along one side of insulating housing 21, adjacent and corresponding to the upper and lower pin terminal ports 7. Each card ejection mechanism 12 includes an ejection rod 13, a push rod 14 and a mold gear 15 operatively connecting push rod 14 to ejection rod 13. When push rod 14 is actuated by its button 16, ejection rod 13 is driven in a direction indicated by arrow 17. Ejection rod 13 has a hooked end 18 which is adapted to eject the lateral edge of pc card 1 from card connector 2.

Insulating housing 5 has a metal shell 19 with an opening a front side for receiving pc card 1. Metal shell 19 shields the outer surfaces of upper and lower pc cards 1 inserted in the insulating housing 5.

Figure 9:
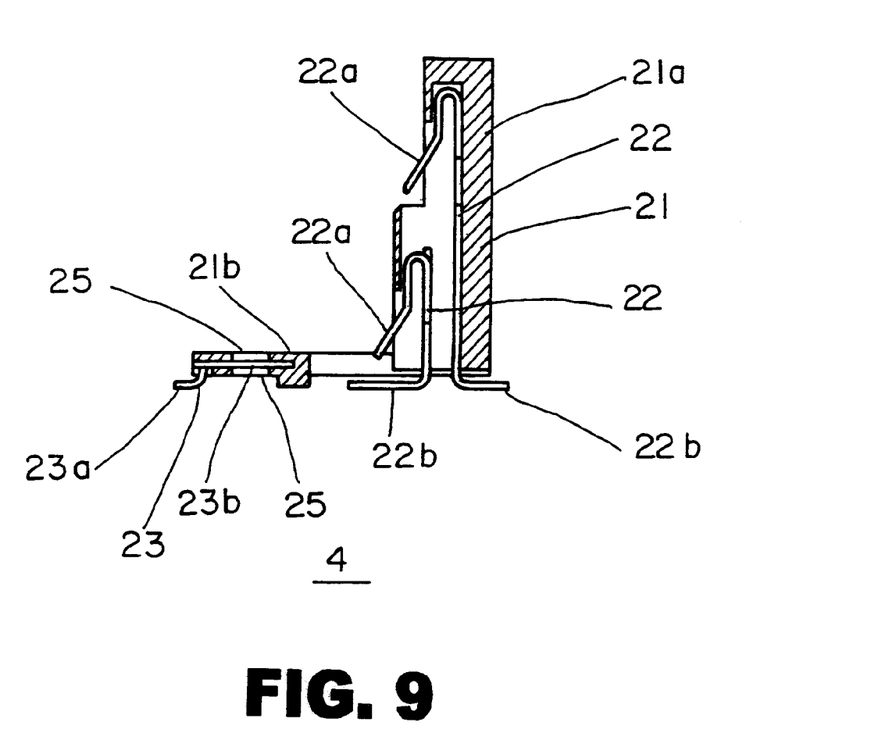
FIG. 9 is an enlarged sectional view of the substrate-connection part of the card connector.
Figure 10:
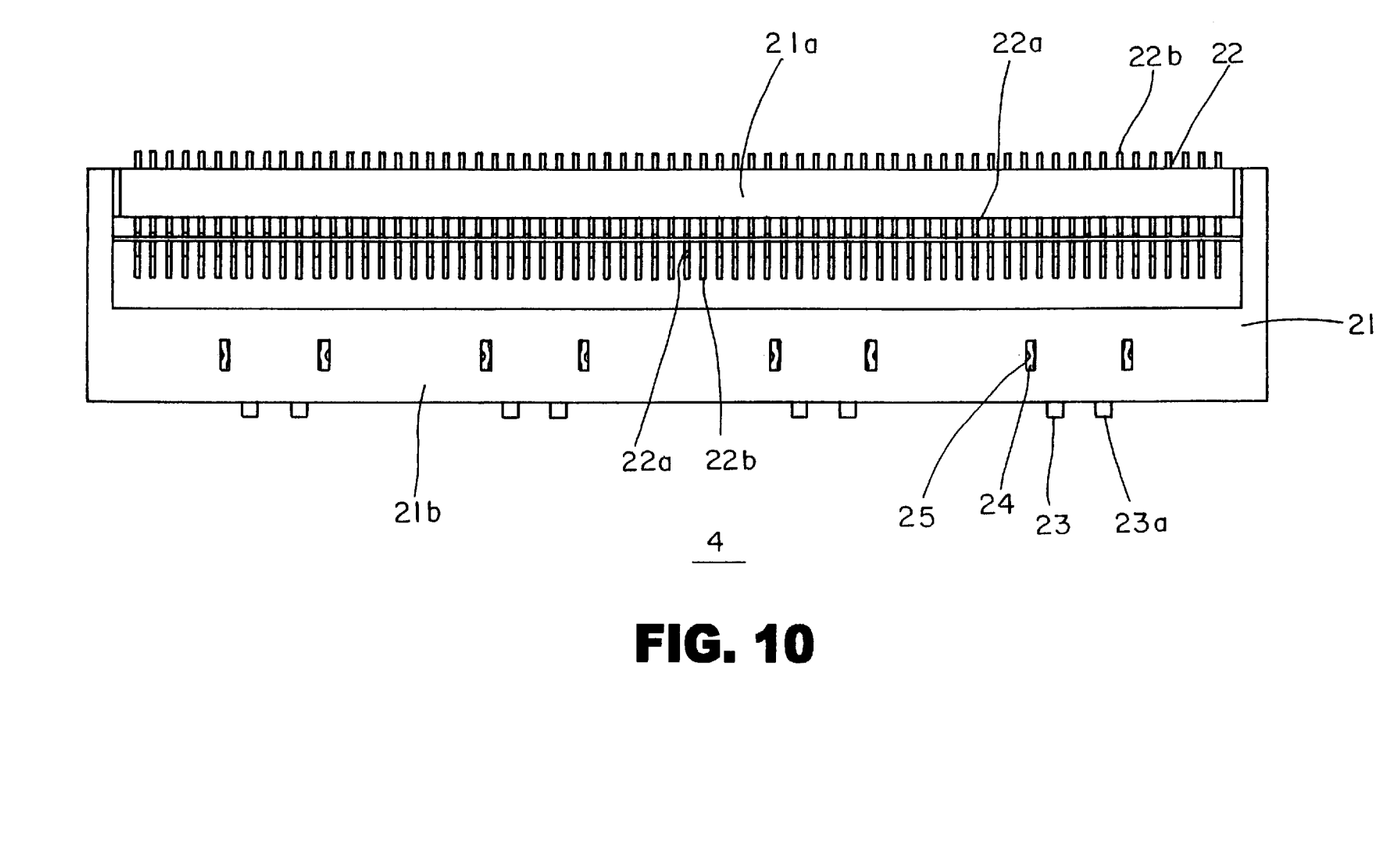
FIG. 10 is an enlarged plan view of the substrate-connection part of the card connector.

As seen in FIGS. 9 and 10, the substrate-connection portion 4 of the card connector comprises an L-shaped insulating housing 21 and includes signal-transfer terminals 22 and grounding terminals 23 mounted therein. Tall and short signal-transfer terminals 22 are arranged at the same intervals as rear tails 8 of signal pin terminals 6 and are mounted in an upright wall 21a of L-shaped insulative housing 21. The different heights of the signal-transfer terminals allow the engagements tails 22a to be arranged at the upper and lower ports and to mate with rear tails 8 of signal pin terminals 6. Soldering tails 22b appear on a bottom or horizontal portion 21b of L-shaped insulating housing 21 and extend in opposite directions.

Grounding terminals 23 are mounted in a lateral edge of horizontal extension 21b of L-shaped insulating housing 21. The grounding terminals include solder tails 23a exposed on the bottom of horizontal extension 21b for connection to corresponding ground traces in an underlying circuit board. Grounding terminals 23 further include engagement apertures 24 formed therein for receiving the lower ends 10a of connection rod terminals 10, which project from the bottom of insulating housing 5. Horizontal extension 21b of L-shaped insulating housing 21 has through-holes 25 formed in alignment with engagement apertures 24 of grounding terminals 23 and connection rod terminals 10.

Substrate-connection part 4 and card-connection part 3 are assembled together to provide card connector 2. In the assembled condition, each engagement tail 22a of signal-transfer terminals 22 is in contact with a corresponding rear tail 8 of signal pin terminals 6, and lower ends 10a of connection rod terminals 10 are located in engagement apertures 24 of grounding terminals 23.

The assembled card connector 2 is mounted on an underlying printed circuit board (not shown), and soldering tails 22b of signal-transfer terminals 22 are soldered to selected conductors of the signal circuit of the circuit board, and soldering tails 23a of grounding terminals 23 are soldered to the grounding circuit of the circuit board. Thus, signal pin terminals 6are connected to the signal circuit of the circuit board via the signal-transfer terminals 22 and grounding terminals 9 are connected to the ground circuit of the circuit board via connection rod terminals 10 and grounding terminals 23, on the bottom of insulating housings 5 and 21, respectively.

As may be understood from the above, the connection of the upper and lower grounding terminals 9 to the ground circuit of the circuit board via the connection rod terminals 10 eliminates the necessity of using grounding shields which extend behind the card connector or a grounding relay substrate attached to one end of the card connector, thereby permitting the card connector to be reduced in size.

Also, connection rod terminals 10, which connect grounding terminals 9 together, are mounted within the insulating housing and terminate at the bottom thereof to connect to the grounding circuit of the circuit board, thus requiring no extra space around the card connector for connection. Accordingly, other circuit devices and components can be placed closer to card connector 2 on the circuit board to allow for higher density circuit board assemblies.

The mating interface of rear tails 8 of signal pin terminals 6 and engagement tails 22a of signal-transfer terminals 22 require minimum space and therefore also contributes to the reduction of the longitudinal size of the card connector.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A card-receiving connector (2) for electrically connecting two pc cards (1) to an underlying printed circuit board, comprising
    a card-connection part (3) including
        an insulating housing (5),
        two ports (7) of signal pin terminals (6) mounted in the insulating housing and adapted to mate with corresponding receptacle sockets of the cards, each signal pin terminal including a contact tail (8) arranged on a rear side of the insulating housing (5),
        two grounding terminals (9) arranged generally parallel to the signal pin terminals (6) and to each other, and
        vertical connection rod terminals (10) intersecting each row of signal pin terminals forward of the contact tails (8) and electrically connecting the parallel grounding terminals (9) to each other, wherein the connection rod terminals (10) are adapted to connect the grounding terminals (9) to a ground circuit of the circuit board.

2. The card-receiving connector (2) according to claim 1 wherein the connection rod terminals (10) are mounted in the insulating housing (5) of the card-connection part (3), and lower ends (10a) of the connection rod terminals (10) are located on a bottom portion of the insulating housing (5), and wherein the connection rod terminals (10) are adapted to be soldered to the ground circuit of the circuit board.

3. A card-receiving connector (2) for electrically connecting two pc cards (1) to an underlying printed circuit board, comprising
    a card-connection part (3) including
        a first insulating housing (5),
        two lateral arrangements (7) of signal pin terminals (6) mounted in the first insulating housing and adapted to mate with corresponding receptacle sockets of the pc cards, each signal pin terminal including a contact tail (8) arranged on a rear side of the first insulating housing (5),
        grounding terminals (9) corresponding and arranged generally parallel to each lateral arrangement of signal pin terminals, and
        vertical connection rod terminals (10) intersecting each row of signal pin terminals (6) forward of the contact tails (8) and electrically connecting the parallel grounding terminals (9) to each other, wherein the connection rod terminals (10) are adapted to connect the grounding terminals (9) to a ground circuit of the circuit board;
    a substrate connection part (4) adapted to be assembled to the card-connection part including
        a second insulating housing (21),
        signal-transfer terminals (22) mounted in the second insulating housing (21) adapted to connect the signal pin terminals (6) of the card-connection part (3) to corresponding signal conductors of the circuit board, each signal-transfer terminal including a contact tail (22a) arranged on a front side of the second insulating housing (21) of the substrate-connection part (4),
    wherein the contact tails (8) of the signal pin terminals (6) of the card-connection part (3) are adapted to contact the contact tails (22a) of the signal-transfer terminals (22) of the substrate-connection part (4) when the card-connection part is assembled to the substrate-connection part.

4. The card-receiving connector (2) according to claim 3 wherein the substrate-connection part (4) further comprises a major grounding terminal (23) adapted to contact the connection rod terminals (10) when the card-receiving part is assembled to the substrate connection part.

5. The card-receiving connector (2) according to claim 4 wherein each grounding terminal (9) is connected to the major grounding terminal (23) of the substrate-connection part (4).

6. The card-receiving connector (2) according to claim 5 wherein the contact tails (8) of the signal pin terminals (6) are arranged laterally in a single row for each lateral arrangement (7) of pin terminals (6) and wherein the contact tails (22a) of the signal-transfer terminals (22) are arranged in rows to correspond to the contact tails (8) of the signal pin terminals (6).

7. The card-receiving connector (2) according to claim 5 wherein the connection rod terminals (10) are mounted in the first insulating housing (5) of the card-connection part (3), and lower portions (10a) of the connection rod terminals (10) are located on a bottom portion (5a) of the first insulating housing (5) of the card-connection part (3), wherein the lower portions (10a) contact the major grounding terminal (23) of the substrate-connection part (4).

* * * * *